United States Patent [19]

Werner

[11] Patent Number: 5,710,788
[45] Date of Patent: Jan. 20, 1998

[54] OPTICALLY STABLE LASER RESONATOR

[75] Inventor: Linus Werner, Neuss, Germany

[73] Assignee: Urenco Deutschland GmbH, Jülich, Germany

[21] Appl. No.: 760,067

[22] Filed: Dec. 4, 1996

Related U.S. Application Data

[63] Continuation-in-part of PCT/EP95/02858, Jul. 20, 1995.

[30] Foreign Application Priority Data

Aug. 19, 1994 [DE] Germany ............ 44 29 452.2

[51] Int. Cl.⁶ ............................................. H01S 3/08
[52] U.S. Cl. ............................ 372/99; 372/92; 372/93; 372/98
[58] Field of Search ............ 372/9, 18, 19, 372/29, 33, 39, 69, 70, 92, 93, 95, 98, 99, 108

[56] References Cited

U.S. PATENT DOCUMENTS

| | | | |
|---|---|---|---|
| 3,731,224 | 5/1973 | Dienes et al. | 372/99 X |
| 3,824,488 | 7/1974 | Aleksoff | 372/99 X |
| 4,491,950 | 1/1985 | Hoffmann | 372/95 |
| 4,745,618 | 5/1988 | Burger | 372/101 |
| 4,887,276 | 12/1989 | Bluege | 372/103 |
| 4,930,138 | 5/1990 | Opower | 372/95 |
| 4,939,739 | 7/1990 | Opower | 372/95 |
| 4,942,588 | 7/1990 | Yasui et al. | 372/103 |
| 4,975,919 | 12/1990 | Amada et al. | 372/33 |
| 5,212,698 | 5/1993 | Kafka et al. | 372/18 |
| 5,289,491 | 2/1994 | Dixon | 372/92 |

FOREIGN PATENT DOCUMENTS

| | | | |
|---|---|---|---|
| 0 371 781 | 6/1990 | European Pat. Off. | 372/99 X |
| 2 594 264 | 8/1987 | France | 372/99 X |

*Primary Examiner*—Brian Healy
*Attorney, Agent, or Firm*—Klaus J. Bach

[57] ABSTRACT

In an optically stable laser resonator which includes at one end a fully reflective mirror, a partially reflective mirror serving as an uncoupling window at the other end and a pair of spherical optical mirrors one being diverging and the other being converging to provide an expanded beam at the uncoupling window wherein the beam axis has an incidence angle $w_1$ with the diverging lens axis which is between 10° and 45° and the axis of the beam extending between the spherical mirrors has an incidence angle with the converging mirror axis which, depending on the mirror distance and the focal length of the mirrors, is so calculated that astigmatism is essentially eliminated.

5 Claims, 3 Drawing Sheets

OPTICALLY STABLE LASER RESONATOR

This is a continuation-in-part application of International Patent Application PCT/EP95/02858 dated 07/20/95, pending, claiming the priority of German application P 44 29 452.2 dated 08/19/94.

BACKGROUND OF THE INVENTION

The invention relates to an optically stable laser resonator with an end mirror, a decoupling window, a laser-action medium and a pair of spherical optical mirrors arranged inside the resonator, one of the pairs of mirror being a diverging mirror and the other being a converging mirror.

Such a laser resonator is known for example from DE 36 04 231.

Laser resonators for high power lasers with special beam characteristics are needed for example for surface treatment techniques. For the removal of paint layers by laser beams as described in the "Industrial Laser Review", Aug. 1991, pages 4 to 9, it is advantageous if the laser beam impinging on the surface to be treated is locally as homogenous as possible.

In principle, it is of course possible to render inhomogenous laser beams relatively homogeneous by using suitable integrators. Such procedures, however, have certain disadvantages: such integrators are generally not only expensive and cumbersome but they also provide for a homogeneous beam only for a certain relatively small distance range (small depth of focus). It is therefore more advantageous if the resonator is capable of not only providing for an essentially homogeneous laser beam but a laser beam which remains homogeneous over a large path length. At the same time, however, the laser beam should have properties which permit beam transmission and beam shaping in a simple manner. In this connection, it is for example advantageous if the laser beam generated with the aid of the resonator can be described by a co-focal parameter, that is, it is as free from astigmatism or asymmetry as possible.

A stable resonator for a high power laser is disclosed in principle in the patent publication DE 36 04 231. It is mentioned therein that it is advantageous for such resonators to reduce the energy or power density at the partially transparent in-coupling window so that the energy density values remain below a certain critical limit above which the system may be damaged. To achieve this it is recommended to use optically diverging and converging elements in the resonator which expand the beam within the resonator so as to provide a larger beam cross-section with smaller energy density in the area of uncoupling, whereby the beam loading per surface area is reduced.

If possible, these elements should have reflecting surfaces since such surfaces can take higher radiation loads and, in addition, are relatively easy to cool. DE 36 04 231 mentions as a disadvantage that the use of spherical mirrors for the diverging and converging elements which are relatively inexpensive and easy to manufacture results generally in an a stigmatic expansion of the beam which provides for an asymmetric laser beam which, according to the authors, can be compensated only by additional optical elements such as a cylindrical mirror.

In order to consider the problems based on astigmatism more closely the calculation of the beam parameters of a resonator with internal expansion of the beam by spherical mirrors is now reviewed:

The pre-stage of a resonator with beam expansion is a resonator which includes a lens arrangement. Such resonator arrangements are known from various publications. Publication [1] explains for example how the beam parameters of such a resonator with an internal focusing element can be calculated. With the expression (14a), (14b) of the publication [1] in combination with the expressions (7) and (8), the characteristic base mode for such a resonator can be calculated according to publication [1].

It is particularly possible to calculate the co-focal parameters of laser beams impinging on the two end mirrors.

If, instead of a single lens, a beam-expanding system including two lenses (telescope) is utilized the formalism of [1] can be employed if, instead of the focal length (or the refraction capability) of the one lens, the common focal length of the system formed by the two elements is employed. Also, the distances from the lenses must be replaced in the known manner by the distances from the main planes. An expression for the focal length and the position of the main planes for a system comprising two lenses is described for example in publication [2] by formulas (23), (24) and (25).

If then the distance of the two lenses is changed, also the resulting focal length and the position of the main planes of the lens system change. As a result, the base modes of the resonator and consequently, also the co-focal parameters of the beam ahead of the final reflectors and the uncoupling mirror can be changed.

If, instead of lenses, spherical mirrors are utilized an astigmatism will occur if a beam reaches these mirrors at an incident angle different from zero. Then these mirrors have two different focal lengths for the tangential and the sagittal directions. Those focal lengths are indicated for spherical mirrors in publication [3], p. 585.

The relationship for the tangential direction is:

$$f_t = f \cos(w)$$

For the sagittal direction, it is:

$$f_s = f/\cos(w)$$

wherein w is the incident angle and f is the focal length with normal incident direction (in the direction of the lens axis–incidence angle=0). The astigmatism of the spherical mirrors is consequently particularly large if large incidence angles are selected; on the other hand, with large incidence angles, the telescope can be short and, consequently, space-saving and compact.

The transformation of laser beams by astigmatic elements can be defined in a simple way if the transverse direction and the sagittal direction are the same for all the elements or when they are at right angles with respect to each other because then, the two spatial direction are uncoupled. With a stable resonator having an astigmatic beam-expanding lens system, the above-described calculation of the base mode for the transverse and sagittal directions can be separately performed. Because of the different total focal lengths for both directions, the co-focal parameters of the base mode of the resonator in tangential and in sagittal direction are generally very different which leads to an astigmatic and/or asymmetrical beam. It may also happen that the resonator is stable only for one direction whereas there is no stable solution for the other direction.

It is the object of the present invention to provide a resonator of the type described which however, although very compact in its design, is essentially free of astigmatism.

SUMMARY OF THE INVENTION

In an optically stable laser resonator which includes at one end a fully reflective mirror, a partially reflective mirror serving as an uncoupling window at the other end and a pair of spherical optical mirrors, one being diverging and the other being converging to provide an expanded beam at the uncoupling window, wherein the beam axis has an incidence angle $w_1$ with the diverging mirror axis which is between 10° and 45° and the axis of the beam extending between the spherical mirrors has an incidence angle with the converging mirror axis which, depending on the mirror distance and the focal length of the mirrors, is so calculated that astigmatism is essentially eliminated.

If both spherical mirrors are arranged in a resonator in the manner as described below the following equations can be derived on the basis of the above comments regarding the focal length $f_1$, $f_2$ of the telescope formed by the two mirrors 4,5 in tangential and in sagittal directions:

$$1/f_t = \frac{1}{f_1 \times \cos(w_1)} + \frac{1}{f_2 \times \cos(w_2)} - \frac{SA}{f_1 \times f_2 \times \cos(w_1) \times \cos(w_2)}$$

$$1/f_s = \frac{\cos(w_1)}{f_1} + \frac{\cos(w_2)}{f_2} - \frac{SA \times \cos(w_1) \times \cos(w_2)}{f_1 \times f_2}$$

wherein $f_t$ is the focal length in tangential direction and $f_s$ is the focal length in sagittal direction.

With the different incidence angles $w_1$ and $w_2$, it is consequently possible to provide for the telescope different focal lengths for the tangential and the sagittal directions which results in different co-focal parameters for the base mode of the resonator for these two directions.

If, with given $w_1$, $f_1$, $f_2$ and SA, the incidence angle $w_2$ is selected as given in claim 1, there will be the same focal length for the sagittal and the tangential directions wherein however, the main planes for the two directions are different as to their positions. With a $w_2$ so selected, the co-focal parameters for the tangential and the sagittal direction for the base mode at the uncoupling window 1 (AS) are almost equal. The detrimental influence of the astigmatism is accordingly compensated for even if large incidence angles are selected.

The tolerance, that is, the amount by which $w_2$ may deviate from the calculated value can be 1°–2° for small angles. However, the tolerance range becomes smaller with increasing values of $w_1$ and decreasing distance SA.

Low beams with a spatially homogeneous beam profile which has a "flat top" shape can be generated by a stable resonator if a plurality of modes (preferably over 10) are amplified within the resonator. The number $N_1$ of the modes is given in publication [3], page 696 to be appropriately $$N = (d/w_0)^2$$

wherein wo is the diameter of the base mode of the resonator and d is the diameter of the laser medium. With the resonator according to the invention the diameter of the base mode can be adjusted by changing the distance between the two spherical mirrors 4, 5. The diameter of the laser medium is given in this case approximately by DT or the extent of the active volume in a direction normal to the beam axis. If then additionally, the conditions of claim 1 are fulfilled, a laser beam with a "flat top" profile can be generated which is almost free of astigmatism.

Below the invention will be described in greater detail on the basis of the enclosed drawings.

DESCRIPTION OF PREFERRED EMBODIMENTS

Figure 1:
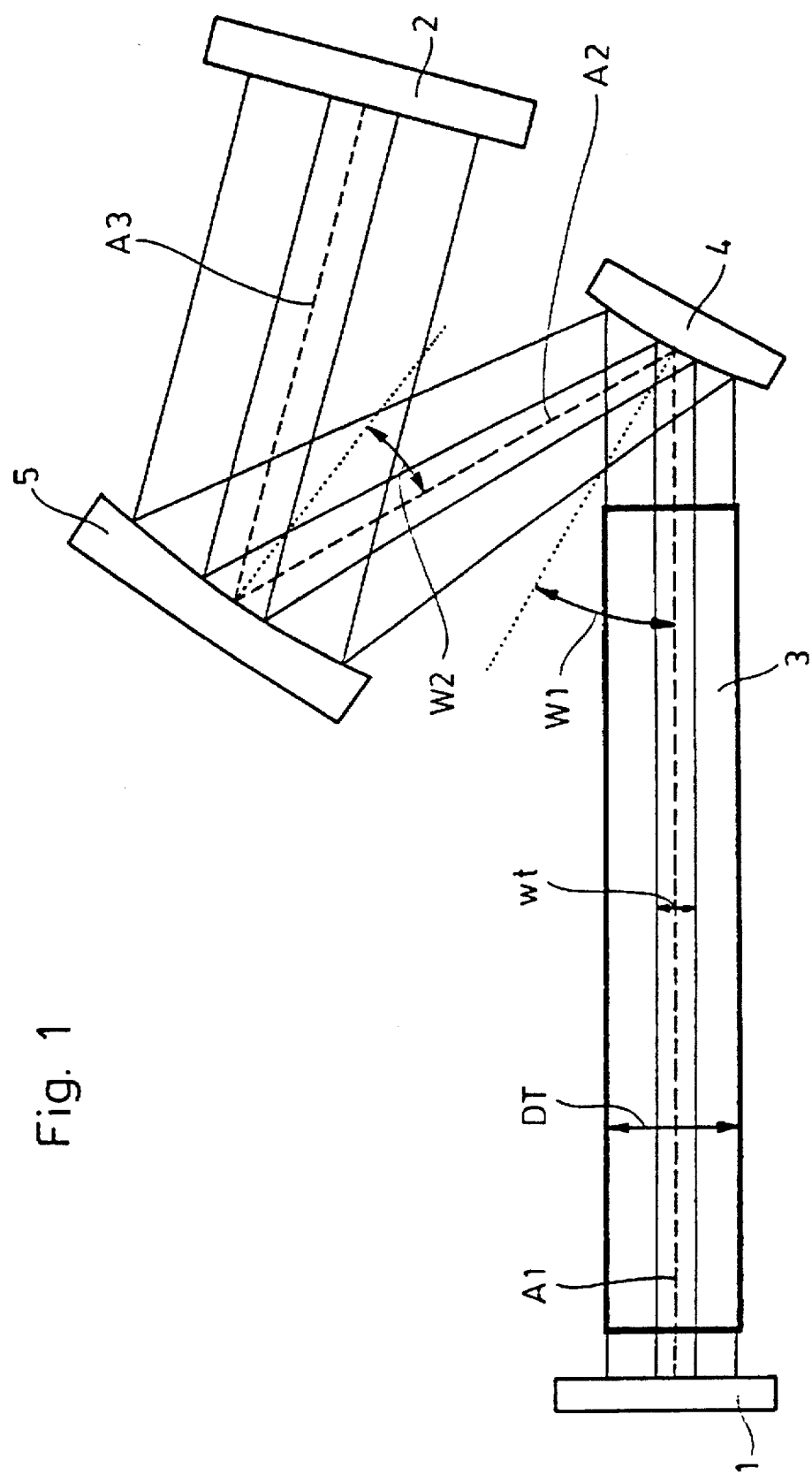
FIG. 1 shows a resonator.

FIG. 1 shows schematically a resonator according to the invention which is designed for a TEA-$CO_2$ laser. The resonator is limited by an end mirror 1 and a partially transparent uncoupling mirror 2. The laser medium 3 is contained between the end mirror 1 and a convex beam-expanding mirror 4. Between the mirror 4 and the uncoupling mirror 2, there is a concave, beam-converging mirror 5. Between the mirror pairs 1,4; 4,5 and 5,2, respectively the base mode axes $A_1$, $A_2$, and $A_3$ are shown.

The distance SA corresponds to the length of the beam axis $A_2$. $W_1$ is the angle between the axis of the mirror 4 and the beam axis $A_1$; and $w_2$ is the angle between the axis of the mirror 5 and the beam axis $A_2$. DT indicates the diameter of the laser medium. The beam diameter in tangential and sagittal direction are indicated by $w_r$, $w_s$ or simply $w_o$.

The data for the resonator are as follows:

End mirror 1 (ES): plane
Uncoupling mirror 2 (AS): plane
Curvature Radius of mirror 4: –0.3 m
Curvature Radius of Mirror 5: 0.45 m
Distance ES—mirror 4: 2 m
Distance As—mirror 5: 0.4 m
SA: between 0.151 and 0.16 m
$w_1$: 16°
$w_2$: about 13°

Figure 2:
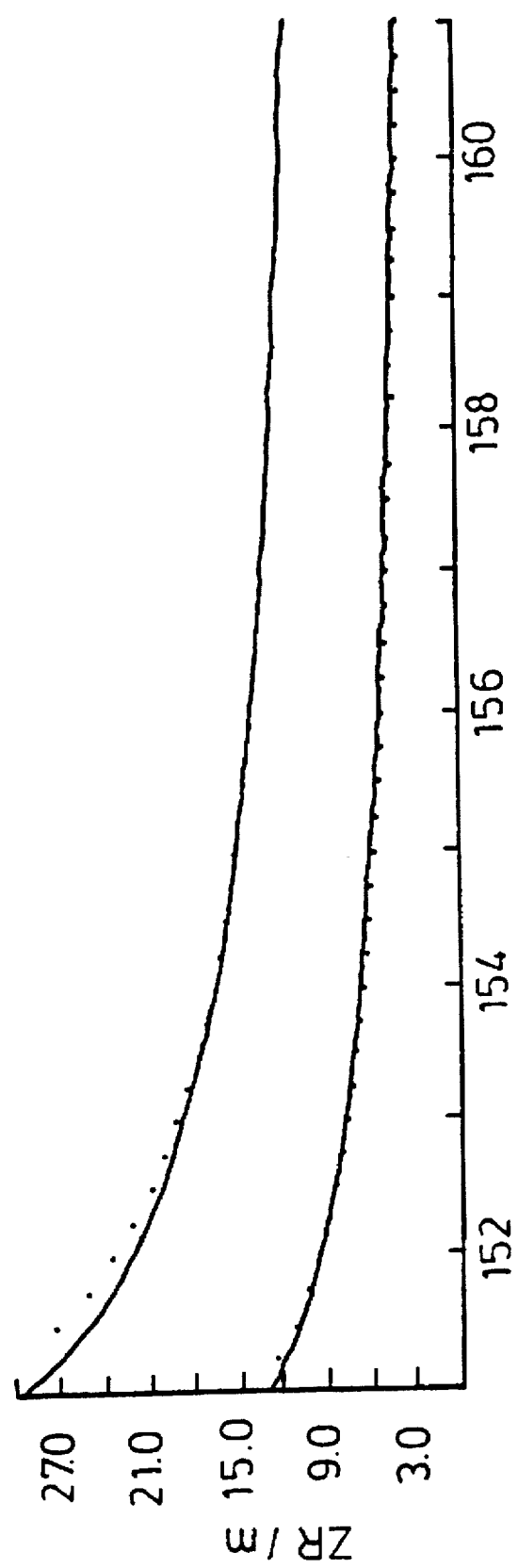
FIG. 2 is a graph of the different co-focal parameters of the resonator.

FIG. 2 shows the various co-focal parameters of the base mode of the resonator dependent on the distance SA between the two mirrors 4, 5 in with the following designations:

ZR-t,ES (lower line, dotted): co-focal parameter in tangential direction between the end mirror (ES) and the convex mirror 4.

ZR-s,ES (lower line, full): co-focal parameter in sagittal direction between the end mirror (ES) and the convex mirror 4.

ZR-t,AS (upper line, dotted): co-focal parameter in tangential direction between the uncoupling mirror (AS) and the concave mirror 5.

ZR-s,AS (upper line, full): co-focal parameter in sagittal direction between the uncoupling mirror (AS) and the concave mirror 5.

It can be seen from FIG. 2, that, in the SA range shown, ZR-t,AS and ZR-s,A as well as ZR-t,ES and ZR-s,ES are almost congruent, which means that astigmatism is almost fully corrected.

How many modes become excited in the resonator depends on the co-focal parameters ZR-t,ES and Z,-s,ES which determine the diameter of the fundamental mode in the laser by the relationship $$\Pi \times (w/2)^2 = 1 \times ZR$$

wherein w is the diameter of the beam constriction, ZR is the co-focal parameter and R is the wave length of the laser.

With a wave length of 10 μm ($CO_2$-laser) and a laser medium with square cross-section wherein DT is 0.03 mm, in the example of FIG. 1, about 17 modes will be generated. As a result, with this resonator a laser beam with a "flat top" profile can be obtained.

Figure 3:
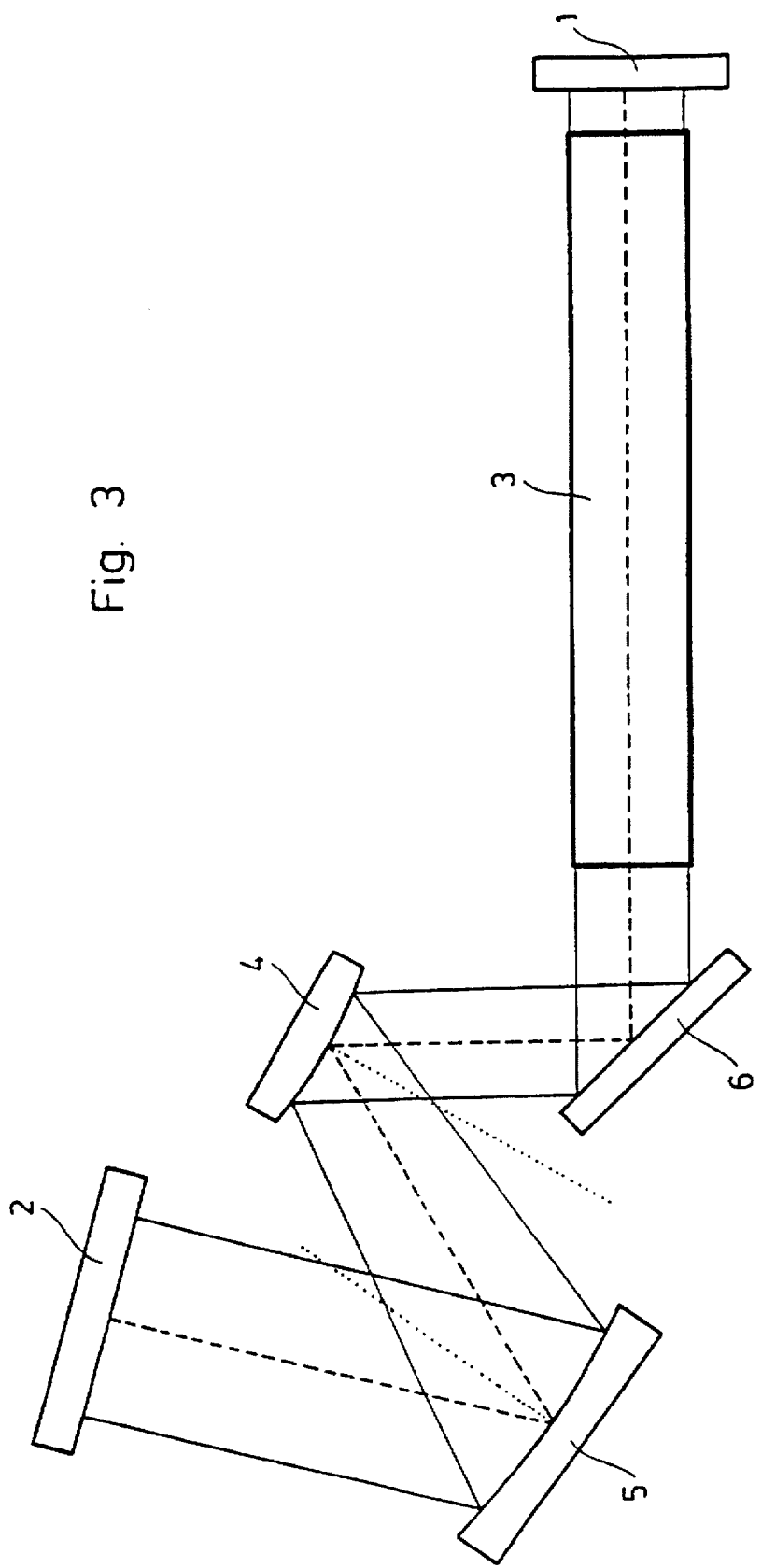
FIG. 3 shows a resonator similar to the one shown in FIG. 1, but somewhat modified.

FIG. 3 shows a resonator wherein an additional planar mirror 6 is disposed between the laser medium 3 and the mirror 5. With this arrangement, the telescope can be positioned more favorably and the laser beam exit direction can be selected independently of the position of the laser medium.

Literature:

[1] G. Herziger and H. Weber, Appl. Opt. 23 (1984) 1450;
[2] H. Kogelnik, Bell Syst. Tech. J. 44 (1965) 455;
[3] A. E. Siegman, "Lasers" ISBN 0-935702-11-5

What is claimed is:

1. An optically stable laser resonator having a base mode beam axis and comprising a fully light reflective end mirror arranged at one end of said resonator, a partially reflective mirror serving as an uncoupling window arranged at the other end of said resonator, a laser active medium enclosed in said resonator, a pair of spherical optical mirrors disposed within said resonator, one being diverging (converse) and the other being converging (concave) to provide for an expanded laser beam at the uncoupling window, wherein the lines extending normally from the mirror surface at the incident points of the base mode beam axis of the resonator are disposed in a single plane, said base mode beam axis extending between said fully light reflective end mirror and said diverging mirror having an incidence angle $w_1$ at the diverging mirror which is larger than 10°, but smaller than 45°, and said base mode beam axis extending between said spherical mirrors having an incidence angle $w_2$ with respect to a normal line extending from the incidence point of said base mode beam axis and said converging mirror, with a predetermined mirror distance SA and a predetermined focal length $f_1$ of said diverging mirror and $f_2$ of said converging mirror which are determined by the formula:

$$\frac{\cos(w_1)}{f_1} + \frac{\cos(w_2)}{f_2} - \frac{SA \times \cos(w_1) \times \cos(w_2)}{f_1 \times f_2} =$$

$$\frac{1}{f_1 \times \cos(w_1)} + \frac{1}{f_2 \times \cos(w_2)} - \frac{SA}{f_1 \times f_2 \times \cos(w_1) \times \cos(w_2)}$$

2. An optically stable laser resonator according to claim 1, wherein said laser-active medium disposed in the space formed between said diverging mirror and said converging mirror is so adjusted that the diameters of the base modes in tangential and sagittal directions are in the laser active medium (beam constrictions) substantially smaller than the dimensions of the active medium in the respective directions within the resonator interior.

3. An optically stable laser resonator according to claim 2, wherein the dimensions of the laser active mediums are at least four times the beam radii.

4. An optically stable laser resonator according to claim 2, wherein the dimensions of the laser active medium are at least 6.3 times the beam radio.

5. An optically stable laser resonator according to claim 1, wherein a plane mirror is arranged between said active medium and said diverging mirror.

* * * * *